United States Patent [19]

Husson, Jr. et al.

[11] Patent Number: 4,761,224

[45] Date of Patent: * Aug. 2, 1988

[54] SILVER-GLASS PASTE WITH POLY-MODAL FLAKE SIZE DISTRIBUTION AND QUICK DRY VEHICLE

[75] Inventors: Frank D. Husson, Jr., San Diego; Kathleen E. Walter, La Jolla, both of Calif.

[73] Assignee: Quantum Materials Inc., San Diego, Calif.

[*] Notice: The portion of the term of this patent subsequent to Jan. 13, 2004 has been disclaimed.

[21] Appl. No.: 1,661

[22] Filed: Jan. 8, 1987

Related U.S. Application Data

[63] Continuation-in-part of Ser. No. 837,543, Mar. 10, 1986, Pat. No. 4,636,254, which is a continuation-in-part of Ser. No. 758,471, Jul. 23, 1985, abandoned.

[51] Int. Cl.$^4$ ................................................ C03C 3/10
[52] U.S. Cl. ................................. 106/1.14; 106/1.19; 252/514
[58] Field of Search ............................ 106/1.14, 1.19; 252/514

[56] References Cited

U.S. PATENT DOCUMENTS

| | | | |
|---|---|---|---|
| 3,497,774 | 2/1970 | Hornberger et al. | 317/101 |
| 4,401,767 | 8/1983 | Dietz et al. | 501/19 |
| 4,435,214 | 3/1984 | Ehrreich | 106/1.19 |
| 4,436,785 | 3/1984 | Dietz et al. | 428/433 |
| 4,459,166 | 7/1984 | Dietz et al. | 106/1.13 |

*Primary Examiner*—Robert Wax
*Attorney, Agent, or Firm*—Baker, Maxham & Jester

[57] ABSTRACT

A silver glass paste consists of 60–75% silver flake having a tap density greater than 2.8 gm/cc and less than 5.0 gm/cc. The silver flake has a poly-modal flake size distribution. The paste further consists of 12–20% glass frit, 0.5–2% of a suitable organic resin and 8–20% of a suitable organic solvent. The resin may be acrylic and the organic solvent may be an ester alcohol or an ester alcohol mixed with a glycol ether or glycol ether ester.

19 Claims, 1 Drawing Sheet

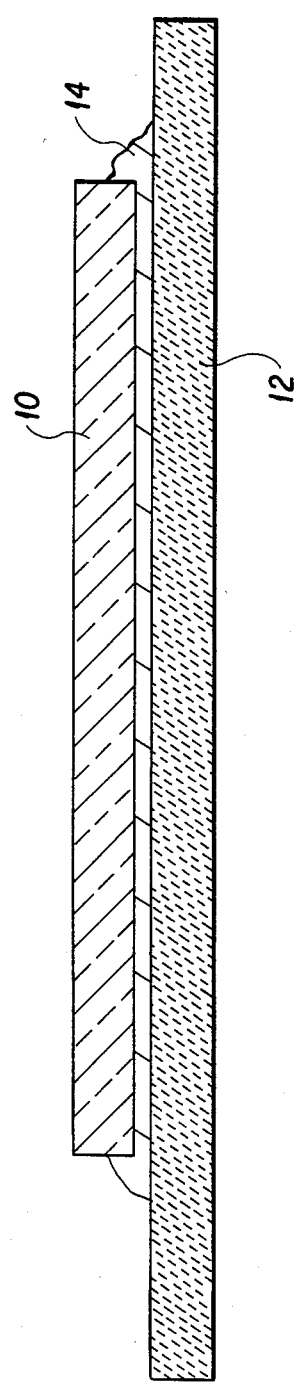

SILVER-GLASS PASTE WITH POLY-MODAL FLAKE SIZE DISTRIBUTION AND QUICK DRY VEHICLE

CROSS-REFERENCE TO RELATED APPLICATIONS

This application is a continuation-in-part of our prior U.S. patent application Ser. No. 837,543 filed Mar. 10, 1986 which was in turn a continuation-in-part of our prior U.S. patent application Ser. No. 758,471 filed July 23, 1985 and now abandoned. The Ser. No. 837,543 Application issued on Jan. 13, 1987 as U.S. Pat. No. 4,636,254 entitled "SILVER-GLASS PASTE FOR ATTACHMENT OF SILICON DIE TO CERAMIC SUBSTRATE."

BACKGROUND OF THE INVENTION

The present invention relates to the art of packaging semiconductor devices, and more particularly, to an improved silver-glass paste which is fired in an oven to securely bond semiconductor die to ceramic substrates.

Silver-glass pastes have been used in the past for attaching silicon die to ceramic substrates. One prior art silver-glass paste uses silver flakes and lead zinc borate glass frit mixed in a liquid organic vehicle. During an initial drying phase, the liquid vehicle evaporates. Upon firing in an oven, the remaining organic vehicle decomposes and the glass melts down to wet the ceramic substrate, while the silver flake sinters together. Upon cooling, the result is a bond between the silicon die and the ceramic substrate.

U.S. Pat. Nos. 3,497,774 of Hornberger et al. and 4,101,767 of Dietz et al. disclose silver-glass paste formulations for semiconductor die attachment.

SUMMARY OF THE INVENTION

It is therefore the primary object of the present invention to provide an improved silver-glass paste for attaching silicon die to a ceramic substrate.

According to our invention, a silver glass paste consists of 60-75% silver flake having a tap density greater than 2.8 g/cc and less than 5.0 g/cc. The silver flake has a poly-modal flake size distribution. The paste further consists of 12-20% glass frit, 0.5-2% of a suitable organic resin and 8-20% of a suitable organic solvent. The resin may be acrylic and the organic solvent may be either an ester alcohol, or an ester alcohol mixed with a glycol ether or a glycol ether ester.

BRIEF DESCRIPTION OF THE DRAWING

The drawing is a diagrammatic illustration of a cross-section of a silicon die 10 bonded to a ceramic substrate 12 by a quantity of the silver-glass paste 14 of the present invention. The drawing is not to scale.

DESCRIPTION OF THE PREFERRED EMBODIMENT

Unless otherwise specified, all percentages herein are given by weight.

A preferred embodiment of our silver-glass paste utilizes two types of Metz Ag flake, type 5SB (larger) and type 15 (smaller) at a ratio of ten to one or less, by weight, and more preferably at a six and one-half to one ratio. The larger flakes prevent undesirable shrinkage in the fired bond which could leave cracks therein. The smaller flakes provide numerous sintering points which improve the bond strength of the fired paste. The mean width of the larger flakes is approximately four times the mean width of the smaller flakes. It will be understood that the flake sizes are obtained by ball milling. Mesh sizes indicated are relative maximum flake size (width), but within a given quantity of silver flake of a specified mesh size, there will be flakes of varying sizes, up to a certain maximum, and normally yielding a mean flake size. Thus our paste can be said to have a "poly-modal flake size distribution" which is achieved by mixing two or more different flake size types. The overall silver flake mixture of our preferred embodiment has a tap density between approximately 2.8 and 5.0 g/cc.

The glass used in the preferred embodiment of our paste is Innotech's Lead Borate type 2561 ($PbOB_2O_3$). The glass particles preferably have a surface area of 0.15 to 3.0 $m^2/g$, and more preferably 0.8 to 1.2 $m^2/g$, and measure about 1-20 micrometers across, and more preferably 2-17 micrometers across. Other low temperature glasses, i.e., with a softening point below 400 degrees C., may be used.

The organic vehicle system of our paste preferably consists of an acrylic resin in a suitable organic solvent. The acrylic resin is preferably a methyl methacrylate monomer polymerized into a low molecular weight polymer, such as DuPont ELVACITE (Trademark) 2008 methyl methacrylate resin. We have found that excellent results can be achieved by mixing two different methyl methacrylate polymers such as ALVACITE 2008 and ELVACITE 2041.

The organic solvent is preferably an ester alcohol, such as 2,2,4-trimethyl-1,3-pentanediol monoisobutyrate which is sold under the trademark TEXANOL. The ester alcohol may also be mixed with either a glycol ether or a glycol ether ester. One suitable glycol ether ester is dipropyleneglycol monomethyl ether acetate, the latter being commercially available under the trademark ARCOSOLVE DPMA. Other alcohols may be used, such as n-butanol or terpineol, but the resulting pastes do not appear to produce a paste with superior qualities such as is achieved by using ester alcohol.

In summary, our silver-glass paste consists of the following components by weight in the ranges specified:

TABLE I

| | |
|---|---|
| silver flake | 60 to 75% |
| glass | 12 to 20% |
| resin | 0.5 to 2% |
| organic solvent | 8 to 20% |

Set forth hereafter in Table II are the parameters of an exact formulation of our paste which has exhibited excellent bonding characteristics:

TABLE II

| | |
|---|---|
| METZ 5SB Ag | 58.59% |
| METZ 15 Ag | 9.01% |
| INNOTECH 2561 glass | 16.90% |
| ELVACITE 2008 resin | 1.70% |
| TEXANOL ester alcohol | 6.90% |
| ARCOSOLVE DPMA solvent | 6.90% |

The poly-modal flake size distribution improves the sintering and the resulting bond strength. The vehicle system leads to a viscosity that improves handling characteristics in automated die attach equipment. The use of a glycol ether or a glycol ether ester and an ester alcohol as a solvent produces a quick dry formulation which lessens the time needed to dry the paste prior to firing the device in an oven.

Having described preferred embodiments of our silver-glass adhesive paste for silicon die attachment, it should be apparent to those skilled in the art that our invention may be modified in both arrangement and detail. Therefore the protection afforded our invention should only be limited in accordance with the scope of the following claims.

We claim:

1. A paste for attaching a silicon die to a ceramic substrate, the paste consisting of:
    approximately 60 to 75% silver flake having a tap density between approximately 2.8 and 5.0 g/cc, the silver flake having a poly-modal flake size distribution with a larger flake size and a smaller flake size, the ratio of the larger flake to the smaller flake being approximately ten to one or less by weight;
    approximately 12 to 20% glass frit having a softening point of less that 400 degrees C.;
    approximately 0.5 to 2% organic resin; and
    approximately 8 to 20% organic solvent.

2. A paste according to claim 1 wherein the organic resin is acrylic.

3. A paste according to claim 2 wherein the solvent consists of an ester alcohol.

4. A paste according to claim 1 wherein the solvent consists of a mixture of an ester alcohol and a glycol ether.

5. A paste according to claim 1 wherein the solvent consists of a mixture of ester alcohol and glycol ether ester.

6. A paste according to claim 5 wherein the glycol ether ester is dipropyleneglycol monomethyl ether acetate.

7. A paste according to claim 1 wherein the resin consists of a methyl methacrylate polymer.

8. A paste according to claim 1 wherein the glass is a lead borate glass.

9. A paste according to claim 1 wherein the glass frit has a surface area of approximately 0.8 to 1.2 $m^2/g$.

10. A paste according to claim 1 wherein the resin consists of two different molecular weight methyl methacrylate polymers.

11. A paste according to claim 1 wherein the ratio of the larger to smaller silver flake sizes is approximately six and one-half to one by weight.

12. A paste for attaching a silicon die to a ceramic substrate, the paste consisting of:
    approximately 60–75% silver flake having a tap density between approximately 2.8 and 5.0 g/cc;
    approximately 12 to 20% glass frit having a softening temperature of less than 400 degrees C.;
    approximately 0.5 to 2% acrylic resin; and
    approximately 8 to 20% of an organic solvent selected from the group consisting of an ester alcohol, a mixture of an ester alcohol and a glycol ether and a mixture of an ester alcohol and a glycol ether ester.

13. A paste according to claim 12 wherein the silver flake has a poly-modal flake size distribution.

14. A paste according to claim 13 wherein the silver flake has at least two types of flake including a larger size and a smaller size, the ratio of the larger size flakes, by weight, being approximately ten to one or less.

15. A paste according to claim 12 wherein the glass is a lead borate glass.

16. A paste according to claim 12 wherein the glass frit has a surface area of approximately 0.8 to 1.2 $m^2/g$.

17. A paste according to claim 12 wherein the glycol ether ester is dipropyleneglycol monomethyl ether acetate.

18. A paste according to claim 14 wherein the ratio of the larger to smaller flake sizes is approximately six and one-half to one by weight.

19. A paste for attaching a silicon die to a ceramic substrate, the paste consisting of:
    approximately 60 to 75% silver flake having a tap density between approximately 2.8 and 5.0 g/cc, the silver flake having a poly-modal flake size distribution with a larger flake size and a smaller flake size, the ratio of the larger flake to the smaller flake being approximately ten to one or less by weight;
    approximately 12 to 20% lead borate glass frit having surface area of approximately 0.8 to 1.2 $m^2/g$ and a softening point below 400 degrees C.;
    approximately 0.5 to 2% methyl methacrylate resin; and
    approximately 8 to 20% of an organic solvent selected from the group consisting of ester alcohol, a mixture of an ester alcohol and a glycol ether and a mixture of an ester alcohol and a glycol ether ester.

* * * * *

UNITED STATES PATENT AND TRADEMARK OFFICE
CERTIFICATE OF CORRECTION

PATENT NO. : 4,761,224

DATED : August 2, 1988

INVENTOR(S) : Husson, Jr. et al.

It is certified that error appears in the above-identified patent and that said Letters Patent is hereby corrected as shown below:

In Claim 1, column 3, line 20, delete "that" and insert therefor --than--.

In Claim 5, column 3, line 31, before "ester" insert --an-- and before "glycol" insert --a--.

In Claim 14, column 4, line 17, after "larger" insert --to smaller--.

In Claim 19, in line 43, before "ester" Insert --an--.

Signed and Sealed this

Thirteenth Day of December, 1988

Attest:

DONALD J. QUIGG

*Attesting Officer*

*Commissioner of Patents and Trademarks*